United States Patent
Inagaki et al.

(10) Patent No.: US 6,736,863 B2
(45) Date of Patent: May 18, 2004

(54) METHOD OF DYEING A PLASTIC LENS, A PLASTIC LENS OBTAINED BY USE OF THE DYEING METHOD, AND A DYEING SYSTEM, A DYEING DEVICE, AND A DYEING JIG FOR A PLASTIC LENS

(75) Inventors: Yasuhiro Inagaki, Nukata-gun (JP); Minoru Inuzuka, Hazu-gun (JP)

(73) Assignee: Nidek Co., Ltd., Gamagori (JP)

( * ) Notice: Subject to any disclaimer, the term of this patent is extended or adjusted under 35 U.S.C. 154(b) by 31 days.

(21) Appl. No.: 10/082,224

(22) Filed: Feb. 26, 2002

(65) Prior Publication Data

US 2002/0148053 A1 Oct. 17, 2002

(30) Foreign Application Priority Data

Mar. 2, 2001 (JP) ........................................ 2001-059081

(51) Int. Cl.$^7$ .................................................. D06P 5/00
(52) U.S. Cl. ..................... 8/506; 8/470; 8/471; 156/230
(58) Field of Search ............................ 8/470, 471, 506; 156/230

(56) References Cited

U.S. PATENT DOCUMENTS

| 5,052,337 | A | * | 10/1991 | Talcott et al. |
| 5,302,223 | A | * | 4/1994 | Hale |
| 6,520,999 | B1 | * | 2/2003 | Kamata et al. |
| 6,534,443 | B2 | * | 3/2003 | Inuzuka |
| 6,554,873 | B2 | * | 4/2003 | Inuzuka et al. |

FOREIGN PATENT DOCUMENTS

| EP | 0 982 432 A | 3/2000 |
| EP | 1 122 355 A | 8/2001 |
| JP | 56 153321 A | 11/1981 |
| JP | 01 277814 A | 11/1989 |
| JP | 02 023314 A | 1/1990 |
| JP | 2000 009905 A | 1/2000 |
| JP | A 2000-329901 | 11/2000 |

* cited by examiner

*Primary Examiner*—Margaret Einsmann
(74) *Attorney, Agent, or Firm*—Oliff & Berridge, PLC

(57) ABSTRACT

A dyeing method for dyeing a plastic lens, a plastic lens obtained by use of the dyeing method, and a dyeing system, a dyeing device, and a dyeing jig for a plastic lens are disclosed. The method includes a producing step of producing a print base body on which a print area is printed with a sublimatable dye by a printer under control of a computer, the printer being previously supplied with the dye; a placing step of placing the print base body and a lens to be dyed so that the print area on the base body is brought into nearly close contact with a lens surface to be dyed; and a transferring step of heating at least the print base body to sublimate the sublimatable dye of the print area, thereby transferring the dye to the lens surface to be dyed.

21 Claims, 4 Drawing Sheets

US 6,736,863 B2

METHOD OF DYEING A PLASTIC LENS, A PLASTIC LENS OBTAINED BY USE OF THE DYEING METHOD, AND A DYEING SYSTEM, A DYEING DEVICE, AND A DYEING JIG FOR A PLASTIC LENS

BACKGROUND OF THE INVENTION

1. Field of the Invention

The present invention relates to a method of dyeing a plastic lens by vapor phase transfer, a plastic lens obtained by use of the dyeing method, and a dyeing system, a dyeing device, and a dyeing jig for a plastic lens to implement the dyeing method.

2. Description of Related Art

Heretofore, there have been known lenses with graphic designs such as pictures and letters. These designs are given to the lenses by affix of seals on which pictures, letters, and the like are printed or by silk-screen printing on lens surfaces.

Such the pictures and letters applied on the lens surfaces by the seals or the silk-screen printing tend to peel as time passes. Instead of the printing on the lens surfaces, dyeing pictures, letters, and the like on lenses may solve the above problem. However, there has been proposed no method of dyeing the pictures, letters, and the like on lenses.

SUMMARY OF THE INVENTION

The present invention has been made in view of the above circumstances and has an object to overcome the above problems and to provide a method of easily dyeing desired graphic designs such as pictures and letters on a plastic lens, a plastic lens obtained by use of the dyeing method, and a dyeing system, a dyeing device, and a dyeing jig for implementing the dyeing method to easily dye the desired graphic designs on a plastic lens.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, in a first aspect, there is provided a method of dyeing a plastic lens, the method including: a producing step of producing a print base body on which a print area is printed with a sublimatable dye by a printer under control of a computer, the printer being previously supplied with the dye; a placing step of placing the print base body and a lens to be dyed so that the print area on the base body is brought into nearly close contact with a lens surface to be dyed; and a transferring step of heating at least the print base body to sublimate the sublimatable dye of the print area, thereby transferring the dye to the lens surface to be dyed.

According to a second aspect of the present invention, there is provided a plastic lens obtained by use of the dyeing method in the first aspect.

According to a third aspect of the present invention, there is provided a dyeing system for a plastic lens, the system including: a computer which stores at least color data and into which data on a desired graphic design and data on color of the design are input; a printer which is connected to the computer and supplied with a sublimatable dye, and prints a print area with the dye based on the input data under control of the computer to produce a print base body; a placing unit which places the print base body and a lens to be dyed so that the print area on the print base body is brought into nearly close contact with a lens surface to be dyed; and a transferring unit which heats at least the print base body to sublimate the sublimatable dye of the print area to transfer the dye to the lens surface to be dyed.

According to a fourth aspect of the present invention, there is provided a dyeing device for a plastic lens, the device including: a lens holder for holding a lens to be dyed; a pressing member including a pressing part having a shape substantially corresponding to a shape of a lens surface to be dyed; a pressing unit for applying a pressing force to the lens and the pressing member which are in nearly close contact with each other through a print base body, from a side of at least one of the lens and the pressing member; and a heating unit for heating at least the print base body.

According to a fifth aspect of the present invention, there is provided a dyeing jig for dyeing a plastic lens, the jig including: a lens holder for holding a lens to be dyed; a pressing member including a pressing part having a shape substantially corresponding to a shape of a lens surface to be dyed; and a pressing unit for applying a pressing force to the lens and the pressing member which are in nearly close contact with each other through a print base body, from a side of at least one of the lens and the pressing member.

BRIEF DESCRIPTION OF THE DRAWINGS

The accompanying drawings, which are incorporated in and constitute apart of this specification illustrate an embodiment of the invention and, together with the description, serve to explain the objects, advantages and principles of the invention.

In the drawings.

DETAILED DESCRIPTION OF THE PREFERRED EMBODIMENTS

Figure 1:
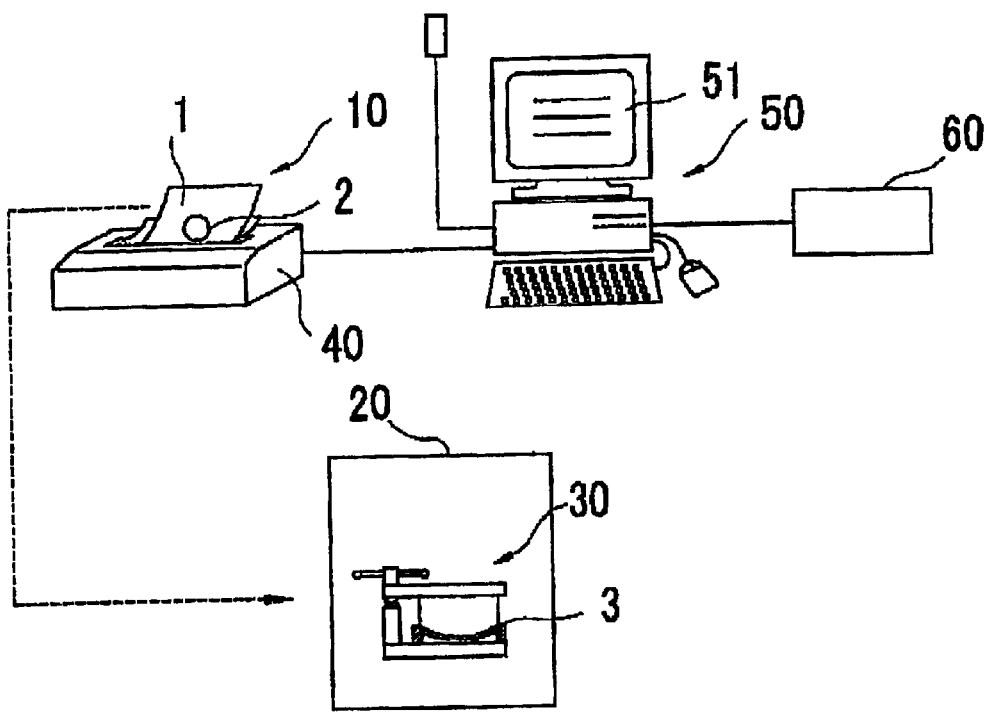
FIG. 1 is a schematic structural view of a dyeing system for dyeing a plastic lens in an embodiment according to the present invention.
Figure 4:
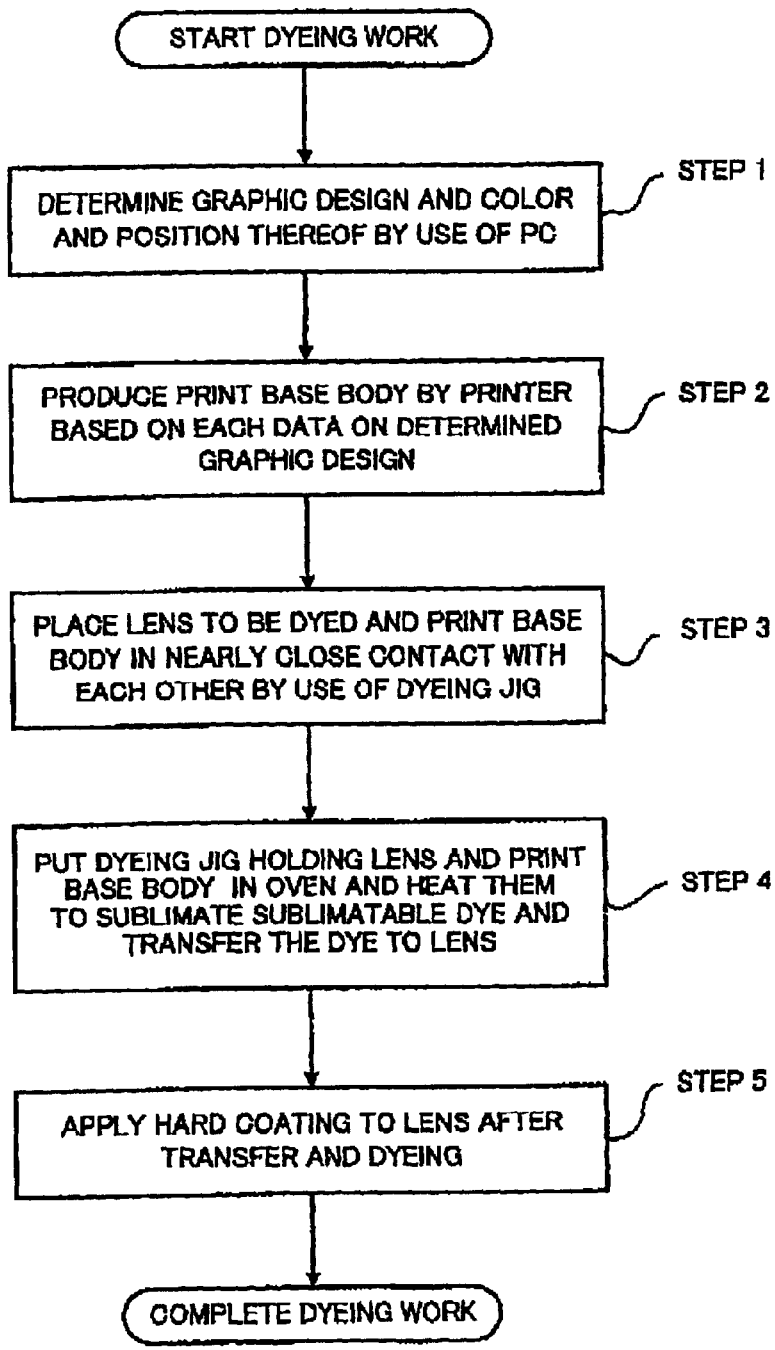
FIG. 4 is a flowchart showing a process for dyeing a plastic lens in the embodiment according to the present invention.

A detailed description of a preferred embodiment according to the present invention will now be given referring to the accompanying drawings. FIG. 1 is a schematic structural view of a dyeing system for dyeing a plastic lens. FIG. 4 is a flowchart showing a process for dyeing the plastic lens.

(1) Preparation of Inks

First of all (prior to dyeing) inks for the dyeing, which is used in an ink jet printer, are prepared in the following manner. In the present embodiment, dyes of three colors; RED, YELLOW, and BLUE are used to prepare inks of four colors (red, yellow, blue, and black). Any existing dyes having a sublimatable property (dyes including sublimatable pigments) are usable for the above dyes. Preferably, hydrophobic disperse dyes are used. In the present embodiment, the dyes are heated to a predetermined temperature to cause sublimation. It is therefore necessary to use dyes capable of resisting the heat generated at sublimation. For actual use, the dyes are put in ink cartridges for the ink jet printer. Therefore the dyes are desired to have a minimum size in diameter.

The red, yellow, and blue inks are prepared as follows. The RED, YELLOW, and BLUE dyes are put in separate vessels. In each vessel, furthermore, pure water and a dispersing agent are added and sufficiently stirred. The BLACK ink is produced by mixture of the RED, YELLOW, and BLUE dyes.

The prescription of each ink is determined such that a ratio of a dye to the total volume of an ink is preferably 0.1 wt % to 20 wt %, more preferably, 0.5 wt % to 10 wt %. If the dye is less than 0.1 wt %, a desired color density could not be often obtained. If the dye is more than 20 wt %, dispersibility of the dye would become low. The dispersing agent to be used is needed to have properties of not decomposing by heat and of resisting heat.

After the dye, dispersing agent, and pure water are sufficiently mixed in each vessel, these vessels containing respective mixtures are placed in a container in which cooling water is filled. Then, a process using an ultrasonic homogenizer is carried out for a predetermined time to regulate the particle size of each dye to a desired diameter. After that, a filter (glass fiber filter paper GF/B) having pores of a size of about 0.5 $\mu$m to 1 $\mu$m is used to suction-filter each mixture to remove particles of a large size, dregs and the like. Sequentially, pure water is further added to adjust each mixture to a desired density. Thus, the ink production is completed.

(2) Production of a Print Base Body

The four kinds of inks produced in the above manner are poured into separate cartridges. These cartridges are mounted in an ink jet printer (hereinafter, referred to as a printer) 40. For the printer 40 and its ink cartridges, commercially available ones may be used.

With the printer 40, a print base body 10 is produced in the following manner. The printer 40, under control of a personal computer (hereinafter, referred to as a PC) 50, produces the print base body 10 according to data on graphic designs such as pictures, letters, etc. and data on their color, density, etc. For the PC 50, a commercially available one may be used.

Figure 3A:
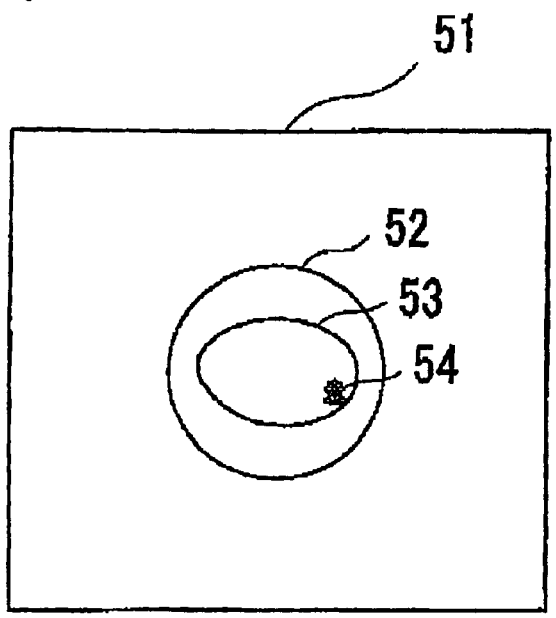
FIG. 3A is a view of an example of a screen of a personal computer for producing the print base body.

To be more specific, as shown in FIG. 3A, a monitor screen 51 of the PC 50 displays a circular line 52 (having the same diameter as that of the plastic lens 3) based on the diameter of the lens 3 previously input by use of a keyboard and the like connected to the PC 50. Simultaneously, the screen 51 displays a spectacle frame form (frame line) 53 by overlaying it on the circular line 52 based on frame data transmitted from a measuring device (a tracer) 60 shown in FIG. 1 which measures the form (shape) of a frame. The positional relation between the circular line 52 and the frame form 53 is determined by a program made in consideration of a geometric or optical center of the lens 3, a distance between pupils of a spectacle wearer, and other correction matters.

In the present embodiment, the frame data is obtained by use of the tracer 60, but it is not limited thereto. The PC 50 may store data on many frames in advance so that a desired one is selected from among them.

A graphic design 54 (a flower design in the present embodiment) which has previously been produced is arranged in a desired position within the frame form 53 displayed on the screen 51. Data on the graphic design 54 may be obtained by a scanner which reads a desired picture or the like or produced by a drawing software. Alternatively, many graphic design data may be stored in advance in the PC 50 so that a desired one is selected from among them. Color and density of the graphic design 54 are determined based on color data stored in the PC 50 (Step 1).

Since the PC 50 is used as above, the data can be stored in the PC 50 and therefore the same data can be used anytime as required.

A base body used in the present embodiment, to which the inks for dyeing (the sublimatable dye) are to be printed, is an A4-sized paper 1 which is commercially available. The base body is not particularly limited to paper and maybe any materials on which the printer 40 can print. Considering that the base body is heated during vapor phase transfer, a substance having good heat-absorbency is preferably used in the present embodiment.

An operator sets the paper 1 in the printer 40 and operates the PC 50 to print on the paper 1 based on the determined graphic design data. At this time, according to the position (the dyeing position) of the graphic design 54 with respect to the frame form 53, a print area (a colored layer) 2 is printed on the paper 1 (Step 2).

Figure 3B:
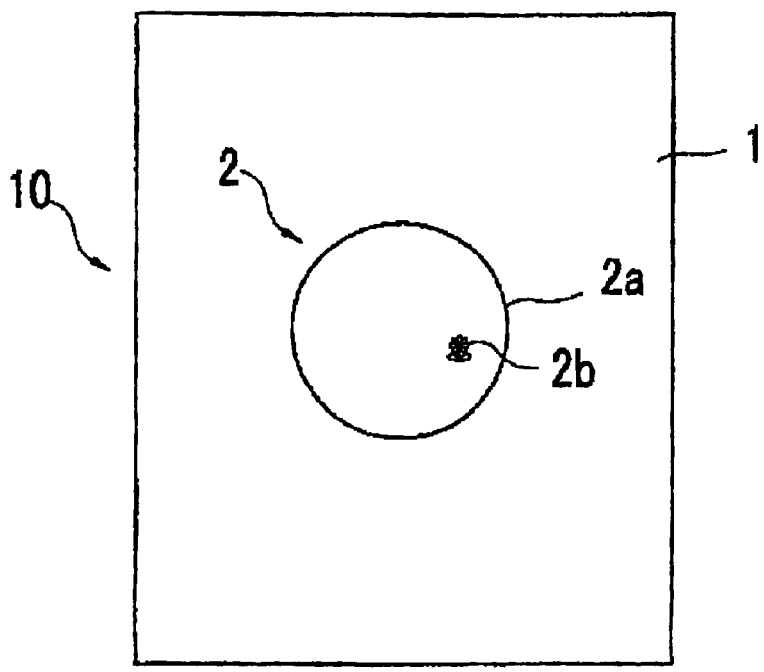
FIG. 3B is a view showing the print base body produced according to the screen shown in FIG. 3A.

As shown in FIG. 3B, the printer 40 prints a circular form (line) 2a and a graphic design 2b in the print area 2 on the paper 1. Thus, the production of the print base body 10 is completed.

The circular form 2a is a guide (an alignment mark) used for overlapping the print base body 10 (the print area 2) on the lens 3. The circular form 2a is preferably printed with the finest and lightest line to prevent the form 2a from being dyed on the lens 3 during the dyeing. However, the peripheral edge of a lens will usually be cut away (ground) at working or machining and thus no problem occurs even if the lens edge is slightly dyed.

In the case that the lens is worked or machined without cutting away (grinding) a part of the peripheral edge, the circular form 2a is required only to have a diameter slightly larger than that of the lens 3. Thus, the lens 3 can be prevented from being dyed unnecessarily. In general, a circle can be identified in form if three points on its periphery are found. Accordingly, plural (three or more) marks may be printed only at points on the periphery instead of printing of the full circular form 2a on the paper 1. These marks are more preferably formed in portions which will be cut away (ground) at the machining. The portions to be cut away (ground) can easily be specified by comparison between the shape (the circular form 2a) of the lens 3 and the frame form 53.

The paper 1 on which the print area 2 is printed by the printer 40 in the above manner is used as the print base body 10.

(3) Dyeing of a Plastic Lens

Figure 2:
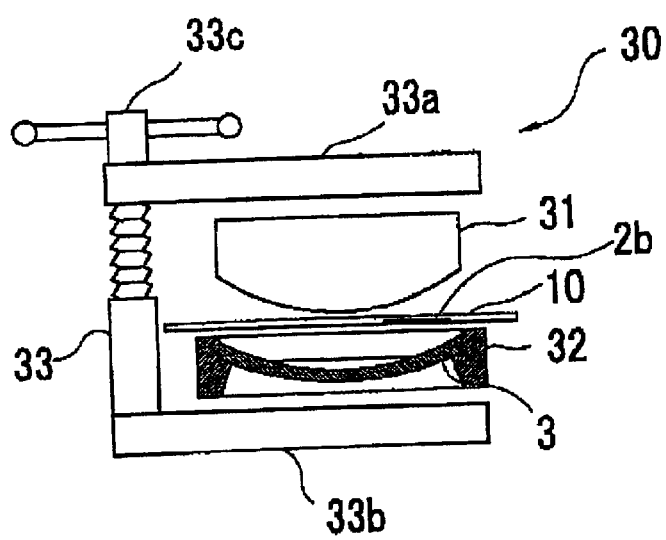
FIG. 2 is a schematic side view of a structure using a dyeing jig to hold a plastic lens and a print base body in nearly close contact with each other.

Subsequently, the print base body 10 produced as above and the lens 3 are brought into nearly close contact with each other by means of a dyeing jig 30 (Step 3). This jig 30 is placed in an oven 20 for performing the transfer and dyeing to the lens 3. FIG. 2 is a side view of the dyeing jig 30.

The dyeing jig 30 is constructed of a pressing member (pad) 31, a lens holder 32, and a pressing tool 33. The pressing member 31 is used to press the print base body 10 against the lens 3 to conform to the shape of a surface to be dyed (namely, a curved surface). For this purpose, the pressing member 31 is preferably provided with a pressing part being flexible and deformable in correspondence with the shape of the surface of the lens 3 to be dyed. The pressing member 31 used in the present embodiment is made of silicone resin. It is also possible to select a desired one from among plural pressing members each having a pressing part with a different shape according to a surface of various lenses.

The pressing tool 33 is constructed of an upper part 33a and a lower part 33b for sandwiching therebetween the pressing member 31, the print base body 10, and the lens 3, and a drive part 33c for moving the upper part 33a up or down.

The lens 3 is placed with the concave surface side up in the lens holder 32 disposed on the lower part 33b of the pressing tool 33. Then, the print base body 10 and the pressing member 31 are set in turn on the lens holder 32. This lens holder 32 holds the periphery edge of the lens 3 in the present embodiment. It is also possible to use any other holders which hold the portions except the surface of the lens 3 to be dyed.

At the above setting, the print base body 10 is positioned so that the circular form 2a on the base body 10 is overlaid on the periphery edge of the lens 3. Also, the graphic design 2b facing down (facing the lens 3 side) is adjusted to a desired position on the lens 3. The drive part 33c is then turned to move the upper part 33a down, thereby sandwiching the pressing member 31, the print base body 10, and the lens 3 from top and bottom. As a result, the graphic design 2b can be made nearly close contact with a desired position on the lens 3. This makes it possible to transfer and dye the graphic design 2b to a desired position on the lens 3.

In the present embodiment, the lens 3 and the print base body 10 are pressed from above to come into contact with each other. Alternatively, they may be pressed from below.

The pressing force to bring the base body 10 into close contact with the lens 3 is desired to be large as much as possible, while it should be determined in consideration of deformation of the lens and other conditions. The pressing force is preferably determined in the range of 10 kPa to 500 kPa, more preferably, in the range of 200 kPa to 400 kPa. If the pressing force is less than 10 kPa, the force of pressing down the base body 10 and the lens 3 becomes insufficient. As a result thereof, the graphic design dyed on the lens 3 may be blurred. If the pressure exceeds 500 kPa, on the other hand, the lens 3 may be deformed or cracked.

The material of the lens 3 to be dyed is appropriately selected from among general materials usable for lenses for eye such as spectacle lenses; for example, a polycarbonate resin (e.g. diethylene glycol bisallyl carbonate polymer (CR-39)), a polyurethane resin, an allyl resin (e.g. allyl diglycol carbonate and the copolymer, and diallyl phthalate and the copolymer), a fumaric resin (e.g. benzyl fumarate copolymer), a styrene resin, a polymethyl acrylate resin, a fiber resin (e.g. cellulose propionate).

After the lens 3 and the print base body 10 are placed as above in the dyeing jig 30, they are put in the oven 20 and heated under normal pressure to carry out the transfer and dyeing to the lens 3 (Step 4). The heating temperature in the oven 20 is preferably set at as high a temperature as possible in a temperature range where deterioration of the dye and deformation of the lens will not occur. The heating temperature is preferably determined in the range of 80° C. to 200 C., more preferably in the range of 100° C. to 150° C. If the heating temperature is below 80° C., the dye is unlikely to sublime sufficiently and therefore the lens 3 could not be dyed satisfactorily. The heating temperature maybe raised beyond 200° C. At such high temperatures, however, the dye is apt to deteriorate in quality and the lens 3 tends to be deformed. The heating time may be determined appropriately if only almost all the dye can sublime from the base body 10. For example, the heating time is set in the range of about 30 min. to 90 min.

In the present embodiment, not only the print base body 10 but also the lens 3 is heated. Alternatively, only the base body 10 may be heated. In this case, an electrically heating wire or the like is provided in advance in the pressing member 31 so that heat is generated from the pressing member 31, which heats only the base body 10. After finish of the transfer and dyeing in the oven 20, the lens 3 is taken out of the dyeing jig 30. The dyeing is thus completed.

After the dyeing, a hard coating may be applied to the lens 3 in order to protect the lens and prevent fading of the dye (Step 5).

The composition of the hard coating is suitably selected from among compositions generally used for a hard coating, for example, a hydrolytic product such as alkoxysilane, a metal oxide, and a curing catalyst. Exemplified as the alkoxysilane are methyl trimethoxy silane, ethyl trimethoxy silane, γ-glycidoxy trimethoxy silane, γ-glycidoxy propyl trimethoxy silane, or the like. As the metal oxide, titania is mentioned. Other examples of the metal oxide are an oxide of metal such as aluminum, iron, zirconium, indium, etc. Exemplified as the curing catalyst are amines, metal chelate, and metallic salt, etc.; more specifically, amines such as guanidine, triethylamine, and aniline, etc.; metal chelate such as chromium(III) in which acetylacetone is coordinated, iron(III), zirconium(IV), etc.; and metallic salt such as tin chloride, iron chloride, aluminum chloride, etc.

The above mentioned materials are properly combined to produce a hard coating solution. A solvent usable for this hard coating solution is alcohols such as methyl alcohol and ethyl alcohol; ketones such as ethyl acetate; and ethers such as diethyl ether.

A coating method of the hard coating solution to the lens 3 after the dyeing is appropriately selected from among generally used coating methods such as dip coating, roller coating, spray coating, spin coating. As a pretreatment to the lens 3 prior to the coating, ultrasonic cleaning, alkali treatment, plasma (RF) treatment, or another kind of treatment may be conducted.

After application of the hard coating to the lens 3, a process for drying the lens 3 is performed. For this drying method, a warm air drying method, an infrared drying method, a CH drying method (a coagulation-heating method), a UV drying method, and another kind of drying method may be used.

EXAMPLE

Next, a concrete example of the dyeing method is shown.

In this example, a CR-39 lens is used. Dyes used are Kayaron Polyester RED BS200 made by Nippon Kayaku Co., Ltd. for a RED dye, Kayaron Michroester AQ-LE made by Nippon Kayaku Co., Ltd. for a YELLOW dye, and Dianix BLUE AC-E made by DyStar Japan Co., Ltd. for a BLUE dye. A dispersing agent used is DEMOL MS made by Kao Corporation.

Table 1 shows the composition of each ink which is filled in each ink cartridge. The ratio between the three colors of dyes for production of a black ink is RED:YELLOW:BLUE=1:2:2.

Table 1

| | RED INK | YELLOW INK | BLUE INK | BLACK INK |
|---|---|---|---|---|
| DYE | 5.0% | 5.0% | 5.0% | 5.0% |
| DISPERSING AGENT | 3.0% | 3.0% | 3.0% | 3.0% |
| PURE WATER | 92.0% | 92.0% | 92.0% | 92.0% |

In the table 1, "%" stands for a weight percent.

The dye, dispersing agent, and pure water for each ink are mixed at the above composition in each vessel and stirred for 10 min. or more. Subsequently, the mixture in each vessel is processed by an ultrasonic homogenizer for a predetermined time (30 min. for about 100 gram of each mixture) to homogenize dye particles into primary particles. Then, each mixture solution is suction-filtered by a filter having pores of a size of about 0.7 µm, so that particles of a large size, dregs, and the like are removed. A proper quantity of pure water is further added to each mixture solution after the suction-filtering to adjust the density. Each dyeing ink is thus produced.

The dyeing inks produced as above (the RED ink, the YELLOW ink, the BLUE ink, and the BLACK ink) are filled in ink cartridges of the ink jet printer 40 (MJ-500C made by EPSON Corporation), respectively. The commercially available paper 1 (gloss paper (black) made by the Mitsubishi Paper Mills Limited) is used for production of the print base body 10. The flower graphic design 2b is printed on the paper 1 by use of a drawing software installed in the PC 50 and the printer 40. The base body 10 is produced. It is to be noted that the color of the graphic design is set at R150, G100, and B50.

After the print base body 10 is dried, the lens 3 and the base body 10 are placed in a nearly close contact relation in the dyeing jig 30. The transfer work (dyeing work) from the base body 10 to the lens 3 is conducted under conditions that the heating temperature in the oven 20 is set at 135° C. and the heating time is set for 1 hour. By this transfer work to the lens 3, a clean flower graphic design can be dyed on the surface of the lens 3.

Although the dyeing is conducted on the concave surface of the lens in the above embodiment, it may alternatively be performed on the convex surface. However, the concave surface is preferred.

As explained above, according to the present invention, a desired graphic design such as pictures, letters, or the like can be easily dyed on a plastic lens.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A method of dyeing a plastic lens having a curved surface including:
    a producing step of producing a print base body on which a graphic design is printed with a sublimatable dye by a printer under control of a computer, the printer being previously supplied with the dye, the graphic design having area smaller than area of the curved lens surface to be dyed;
    a placing step of pressing the print base body against the curved lens surface to be dyed by a pressing member so that the graphic design on the base body is brought into nearly close contact with the curved lens surface to be dyed; and
    a transferring step of heating at least the pressed print base body to sublimate the dye of the graphic design so as to transfer the graphic design to the curved lens surface to be dyed.

2. The dyeing method according to claim 1, wherein the transferring step includes heating both the lens and the print base body.

3. The dyeing method according to claim 1, further including an input step of inputting data on the graphic design and data on color of the design into the computer,
    wherein the producing step includes printing the graphic design based on the input data to produce the print base body.

4. The dyeing method according to claim 3, wherein the input step includes inputting data on a position of the graphic design with respect to the lens to be dyed,
    the producing step includes printing the graphic design and an alignment mark based on the input position data to produce the print base body.

5. The dyeing method according to claim 1, further including a step of applying a hard coat to the lens after the graphic design is transferred thereto.

6. A plastic lens obtained by use of the dyeing method according to claim 1.

7. The plastic lens according to claim 6, including a lens which is used for an eye.

8. The dyeing method according to claim 3, further including a display step of displaying a shape of the lens to be dyed and a shape of a spectacle frame by overlaying each other on a screen,
    wherein the input step includes inputting data on a position of the graphic design based on the display on the screen, and
    the producing step includes printing the graphic design based on the input position data to produce the print base body.

9. The dyeing method according to claim 1, further including a designing step of designing the graphic design with the computer, the graphic design including at least one of a picture and a letter,
    wherein the producing step includes printing the designed graphic design to produce the print base body.

10. The dyeing method according to claim 1, wherein the producing step includes printing the graphic design by jetting the sublimatable dye with the printer to produce the print base body.

11. The dyeing method according to claim 1, wherein the placing step includes pressing the print base body against the curved lens surface to be dyed by the pressing member with a pressing force in a range of about 10 kPa to about 500 kPa.

12. The dyeing method according to claim 1, wherein the transferred step includes heating at least the print base body at a temperature in a range of about 80° C. to about 120° C.

13. A method of dyeing a plastic lens, including:
    a producing step of producing a print base body on which a graphic design and an alignment mark is printed with a sublimatable dye by a printer under control of a computer, the printer being previously supplied with the dye, the graphic design having area smaller than area of a lens surface to be dyed;
    a placing step of aligning the print base body with the lens surface to be dyed by the alignment mark and pressing the print base body against the lens surface to be dyed by a pressing member so that the graphic design on the print base body is brought into nearly close contact with the lens surface to be dyed; and a transferring step of heating at least the pressed print base body to sublimate the dye of the graphic design so as to transfer the graphic design to the lens surface to be dyed.

14. The dyeing method according to claim 12, wherein the transferring step includes heating both the lens and the print base body.

15. The dyeing method according to claim 12, further including an input step of inputting data on the graphic design and data on color of the design into the computer, wherein the producing step includes printing the graphic design based on the input data to produce the print base body.

16. The dyeing method according to claim 15, wherein the input step includes inputting data on a position of the graphic design with respect to the lens to be dyed, the producing step includes printing the graphic design and the alignment mark based on the input position data to provide the print base body.

17. The dyeing method according to claim 15, further including a display step of displaying a shape of the lens to be dyed and a shape of a spectacle frame by overlaying each other on a screen, wherein the input step includes inputting data on a position of the graphic design based on the display on the screen, and the producing step includes printing the graphic design and the alignment mark based on the input position data to produce the print base body.

18. The dyeing method according to claim 13, further including a designing step of designing the graphic design with the computer, the graphic design including at least one of a picture and a letter, wherein the producing step includes printing the designed graphic design to produce the print base body.

19. The dyeing method according to claim 13, wherein the producing step includes printing the graphic design and the alignment mark by jetting the sublimatable dye with the printer to produce the print base body.

20. The dyeing method according to claim 13, wherein the placing step includes pressing the print base body against the lens surface to be dyed by the pressing member with a pressing force in a range of about 10 kPa to about 500 kPa.

21. The dyeing method according to claim 13, wherein the transferring step includes heating at least the print base body at a temperature in a range of about 80° C. to about 120° C.

* * * * *